(12) United States Patent
Felkins et al.

(10) Patent No.: US 8,874,313 B2
(45) Date of Patent: Oct. 28, 2014

(54) VEHICLE LANE CHECKING MONITOR

(71) Applicant: GM Global Technology Operations LLC, Detroit, MI (US)

(72) Inventors: James F. Felkins, Berkley, MI (US); Amanda J. Kalhous, Ajax (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/664,798

(22) Filed: Oct. 31, 2012

(65) Prior Publication Data

US 2014/0121897 A1  May 1, 2014

(51) Int. Cl.
*G06F 7/00* (2006.01)
*B60W 40/08* (2012.01)
*B60W 50/14* (2012.01)

(52) U.S. Cl.
CPC .............. *B60W 50/14* (2013.01); *B60W 40/08* (2013.01)
USPC ........................................................... 701/36

(58) Field of Classification Search
USPC ..................................................... 701/36–37
See application file for complete search history.

(56) References Cited

U.S. PATENT DOCUMENTS

| 2010/0007479 | A1* | 1/2010 | Smith | 340/436 |
| 2010/0131148 | A1* | 5/2010 | Camhi et al. | 701/29 |
| 2011/0241862 | A1* | 10/2011 | Debouk et al. | 340/439 |

* cited by examiner

*Primary Examiner* — Mary Cheung
*Assistant Examiner* — Anne Mazzara
(74) *Attorney, Agent, or Firm* — Cantor Colburn LLP

(57) ABSTRACT

Vehicle lane changing monitor functions are implemented by a lane sensor disposed in a vehicle, a gaze detection sensor disposed in the vehicle, and a computer processor embedded in the vehicle. Logic that is executable by the computer processor implements a method. The method includes receiving data, from the lane sensor, indicating an occurrence of a lane shifting event that indicates the vehicle is drifting away from a vehicle lane. The method further includes monitoring biometric data received from the gaze detection sensor and, upon determining a gaze change event has not occurred within a threshold period of time with respect to the lane shifting event, a corrective action within the vehicle is initiated.

19 Claims, 2 Drawing Sheets

VEHICLE LANE CHECKING MONITOR

FIELD OF THE INVENTION

The subject invention relates to vehicle safety systems and, more particularly, to a vehicle lane checking monitor that incorporates gaze detection biometric data from a vehicle operator to ensure the operator has checked his or her surroundings to ensure it is safe to change lanes.

BACKGROUND

Vehicles today provide many features directed toward enhancing the safety of its operators and passengers. A significant and growing issue in vehicle safety relates to concerns about distractions due to the use of portable electronic devices (music players, cell phones, etc.), interactions and conversations among passengers in the vehicle, and driver inexperience, to name a few.

One common cause of vehicular accidents is the neglect of operators to check rear- and side-view mirrors before turning or performing a lane shift. Oftentimes, this neglect stems from either driver inexperience or an event that results in the distraction of the driver.

It would be desirable to provide a way to identify lane shifting events in which a vehicle operator may have neglected to first check his or her surroundings (e.g., by checking a mirror in the vehicle and/or over his or her shoulder for blind spots) and to perform corrective action in the form of a reminder or an automated re-alignment of the vehicle.

SUMMARY OF THE INVENTION

In one exemplary embodiment of the invention, a system is provided. The system includes at least one lane sensor disposed in a vehicle, a gaze detection sensor disposed in the vehicle, and a computer processor embedded in the vehicle. The computer processor is communicatively coupled to the lane sensor and the gaze detection sensor. The system further includes logic executable by the computer processor. The logic is configured to implement a method. The method includes receiving data from the lane sensor indicating an occurrence of a lane shifting event. The lane shifting event indicates the vehicle is drifting away from a vehicle lane. The method further includes monitoring biometric data received from the gaze detection sensor and, upon determining a gaze change event has not occurred within a threshold period of time with respect to the lane shifting event, the method includes initiating a corrective action within the vehicle.

In another exemplary embodiment of the invention, a method is provided. The method includes receiving, from at least one lane sensor disposed in a vehicle, data indicating an occurrence of a lane shifting event. The lane shifting event indicates the vehicle is drifting away from a vehicle lane. The method further includes monitoring, via a computer processor, biometric data received from a gaze detection sensor and, upon determining a gaze change event has not occurred within a threshold period of time with respect to the lane shifting event, the method includes initiating a corrective action within the vehicle.

In yet another exemplary embodiment of the invention, a computer program product is provided. The computer program product includes a storage medium having computer program instructions embodied thereon, which when executed by a computer processor, cause the computer processor to implement a method. The method includes receiving, from at least one lane sensor disposed in a vehicle, data indicating an occurrence of a lane shifting event. The lane shifting event indicates the vehicle is drifting away from a vehicle lane. The method further includes monitoring biometric data received from a gaze detection sensor and, upon determining a gaze change event has not occurred within a threshold period of time with respect to the lane shifting event, the method includes initiating a corrective action within the vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment of the invention, a vehicle lane checking monitor is provided. The vehicle lane checking monitor provides the ability to determine when a vehicle operator may have neglected to check his or her surroundings (e.g., a mirror in the vehicle and/or over his or her shoulder) prior to, or during, a lane shifting event using biometric data collected from the operator, and to perform a corrective action in response thereto. The corrective action may be a warning or reminder to the operator to check his or her rear- and/or side-view mirrors (over his or her shoulder for a blind spot) or may be an automated action, such as initiating an anti-drift control mechanism that re-aligns the vehicle to the lane from which the lane shifting event occurred. These and other features of the vehicle lane checking monitor will now be described in an exemplary embodiment.

Figure 1:
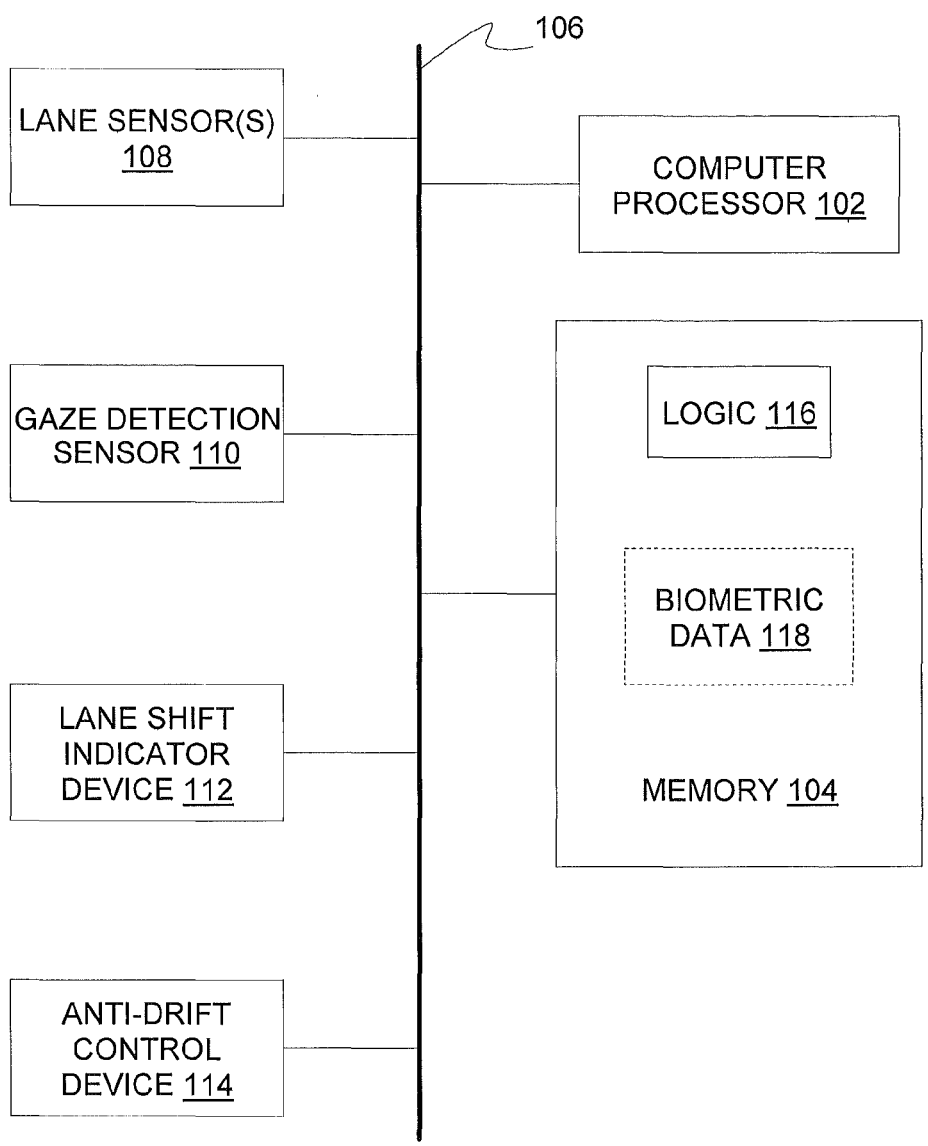
FIG. 1 is a block diagram of a system upon which vehicle lane checking monitor functions may be implemented in accordance with an embodiment.

FIG. 1 illustrates a system 100 upon which vehicle lane checking monitor processes may be performed. The system 100 includes components that form part of a vehicle. The vehicle may be any type of automobile known in the art.

As shown in FIG. 1, the system 100 includes a computer processor 102 and a memory device 104 communicatively coupled to a bus 106. The computer processor 102 is embedded in the vehicle and may include hardware and related circuitry configured to manage various vehicle elements including the vehicle components shown in the system 100 and for communicating therewith. In an embodiment, the computer processor 102 is implemented in part by one or more computer processing units.

The memory device 104 may include any type of memory, such as hard disk memory, virtual memory, random access memory, and cache memory. In an embodiment, the memory device 104 stores logic 116 for implementing the vehicle lane checking monitor processes and also stores biometric data 118, as will be described further herein.

The bus 106 is integrated with the vehicle and may be part of a physically wired network, a wireless network, or a combination thereof. In one embodiment, the network may be a local area network that communicatively couples vehicle electronic components of the vehicle with the computer processor 102. If the bus 106 is part of a wireline network, the bus 106 may be a serial data bus or other data connection.

The components of the vehicle include one or more lane sensors 108, a gaze detection sensor 110, a lane shift indicator device 112, and an anti-drift control device 114. The lane sensors 108 monitor the vehicle operation and provide associated data to the computer processor 102. The associated data is indicative of a lane shift status (e.g., the vehicle is drifting out of a current lane (i.e., a lane shifting event) or is traveling steadily within the lane) and the nature of the data provided may depend on the type of lane sensors 108 employed. For example, a camera or radar mounted in the vehicle detects the edges of a lane in the road and provides this information to the computer processor 102. Other types of sensors may include infrared sensors that may be mounted behind the windshield or under vehicle. The data collected by the lane sensors 108 is transmitted over the bus 106 to the computer processor 102. In one embodiment, the logic 116 executed by the computer processor 102 stores this information in a log file, which may be used to generate reports that summarize the operator's driving behavior with respect to the use of mirrors of the vehicle when performing a lane change. The reports may be useful in providing the operator with knowledge that may assist the operator in developing acute awareness of his or her surroundings while operating the vehicle. The log file may be stored in the memory device 104. The lane sensor data is used to determine whether a lane shift event has occurred. A lane shift event is determined by a measure of the lateral movement of the vehicle as a function of time and may be set by a vehicle manufacturer or other entity.

The gaze detection sensor 110 is configured with gaze detection technology that determines in which direction an operator of the vehicle is looking while operating the vehicle. The gaze detection sensor 110 is configured to differentiate between two areas with limited separation therebetween (e.g., the outside rear-view mirror versus an A-pillar). The gaze detection sensor 110 collects this data relating to the operator's eye positioning (e.g., movement, fixed position, angle or range of movement, etc.), which data is referred to herein as biometric data. In one embodiment, the logic 116 is configured to capture the biometric data for a drive cycle and log this information in a log file, which may be stored in the memory device 104. The log file, in turn, may be used by the logic 116 to generate reports directed to patterns of behavior of the operator over time (e.g., of seven lane change events for a given drive cycle spanning one hour, the operator checked his/her mirror twice). As used herein, a drive cycle refers to an event defined by activation of the vehicle followed by a driving event that results in subsequent de-activation of the vehicle (e.g., a non-stop commute between work and home).

The gaze detection sensor 110 may be disposed in any location of the vehicle that provides maximum quality collection of the biometric data. In an embodiment, the gaze detection sensor 110 may be disposed on the vehicle cluster or dashboard. It will be understood that more than one gaze detection sensor 110 may be employed in implementing the vehicle lane checking monitor described herein. A single gaze detection sensor 110, as shown in FIG. 1, is provided for illustrative purposes and is not intended to limit the scope of the invention.

As indicated above, the vehicle lane checking monitor may be configured to provide a warning or reminder to the operator to check mirrors and/or blind spots. The lane shift indicator device 112 may be activated by the logic 116 to notify or remind the operator to check his or her mirror(s) before completing a lane change. In an embodiment, the lane shift indicator device 112 is activated when a lane shifting event has occurred for a given drive cycle, and the logic 116 has determined from the biometric data 118 that the operator of the vehicle may have failed to check his or her side-view and/or rear-view mirrors (or blind spots) before shifting between lanes on a road or highway. The lane shift indicator device 112 may be implemented using existing vehicle components. For example, the vehicle's lighting elements (e.g., interior overhead lights, dashboard lights, heads up display lighting, etc.) may be configured to intermittently flash signaling a reminder for the operator to check mirror(s). In another example, the vehicle's steering wheel may be configured to vibrate as a reminder to the operator. Other vehicle components may include an infotainment system in which a reminder is implemented through a text message on a display screen or an audio signal (beep, chime, recorded voice message) provided through a speaker system.

As an alternative to the warning or reminders described above (or in addition thereto), the vehicle lane checking monitor (e.g., via the logic 116) may be configured to activate the anti-drift control device 114 when a lane shift event has been determined and the logic 116 has determined that the operator may have failed to check his or her mirrors or blind spots during the lane shift event. In an embodiment, the anti-drift control device 114 may be configured as a steering wheel tug that functions to realign the vehicle with the lane from which the drift occurred.

Figure 2:
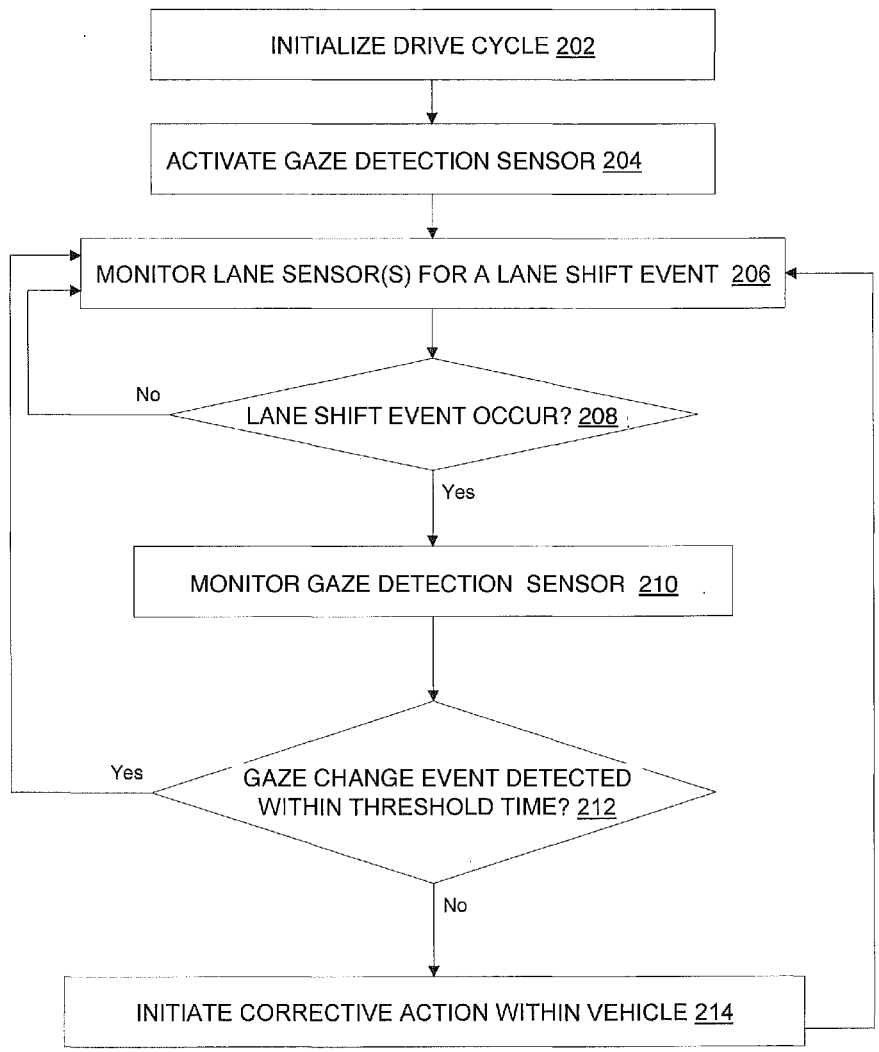
FIG. 2 is a flow diagram describing a process for implementing the vehicle lane checking monitor in accordance with an embodiment.

Turning now to FIG. 2, a flow diagram of a process for implementing the vehicle lane checking monitor in accordance with an embodiment will now be described. The process may begin at the initiation of a drive cycle.

At step 202, a drive cycle is initiated. The drive cycle indicates an operator has entered the vehicle and has engaged the ignition. The logic 116 detects the initialization of the drive cycle and activates the gaze detection sensor 110 at step 204.

The logic 116 monitors the lane sensor(s) 108 and collects data associated with the vehicle operation at step 206 to determine whether a lane shifting event has occurred. A lane shifting event may be calculated using the lateral movement of the vehicle as a function of time.

If a lane shifting event has not occurred at step 208, the process returns to step 206 and the logic 116 continues to monitor lane sensor data from the lane sensor(s) 108. Otherwise, if a lane shifting event has occurred at step 208, the logic 116 monitors biometric data captured by the gaze detection sensor 110 at step 210 to identify whether a gaze change event has occurred. A gaze change event indicates the operator has checked his/her mirror and/or glanced over his or her shoulder within a specified period of time following the lane shifting event. For example, the biometric data indicates the operator has checked his/her side-view mirror.

At step 212, the logic 116 determines whether a gaze change event has occurred within the specified (e.g., threshold) period of time. For example, the logic 116 may be configured such that within a period of one second of the detection of the lane shifting event, the operator should have checked his/her rear view or side view mirrors.

If a gaze change event has occurred at step 212, this means the operator has checked his or her mirror or over his or her shoulder within the threshold time period. In this event, the processor returns to step 206 whereby the logic 116 continues to monitor the lane sensor(s) 108 for another lane shifting event.

If, however, the gaze change event has not occurred within the threshold time period at step 212, this means the operator has not checked his or her surroundings (e.g., mirror and/or over his or her shoulder) within the threshold period of time. In this event, the logic 116 initiates a corrective action at step 214, and the process returns to step 206.

As indicated above, the corrective action may be a warning or reminder to the operator to check his or her mirrors or may include activating the anti-drift control device 114, which guides the vehicle back in the lane. In a further embodiment, the logic 116 may be configured to process the biometric data, the lane shifting events, and the gaze change events in the log file and generate a summary report which may be accessed by an authorized entity (e.g., the vehicle owner, operator, insurer or the vehicle, government agency, etc.). In this manner, the frequency of corrective actions can be tracked for purposes of educating the vehicle operator regarding the importance of checking the vehicle mirrors. The report may be presented on a display device of the vehicle or may be transmitted over a network.

In one embodiment, the logic 116 may be configured to capture additional information along with the lane sensor data and the biometric data. For example, the logic 116 may also monitor the operator's use of the vehicle's turn signals in determining whether a corrective action should be performed. In an embodiment, when a lane shifting event has occurred, the logic 116 may determine whether the operator has used a turn signal corresponding to the lateral direction of the lane shift within a threshold period of time following the detection of the lane shifting event (e.g., one second). The use of the turn signal during the lane shifting event may indicate that the operator has checked his/her mirrors or has looked over his/her shoulder. In this embodiment, the logic 116 may be configured to disregard the biometric data in favor of the turn signal data in determining whether to implement corrective actions.

Technical effects of the invention provide the ability to determine when a vehicle operator may have neglected to check a mirror in the vehicle prior to, or during, a lane shifting event, and to perform a corrective action in response thereto. The corrective action may be a warning or reminder to the operator to check his or her rear- and/or side-view mirrors or may be an automated action, such as initiating an anti-drift control mechanism that re-aligns the vehicle to the lane from which the lane shifting event occurred.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system, comprising:
   at least one lane sensor disposed in a vehicle;
   a gaze detection sensor disposed in the vehicle;
   a computer processor embedded in the vehicle, the computer processor communicatively coupled to the at least one lane sensor and the gaze detection sensor; and
   logic executable by the computer processor, the logic configured to implement a method, the method comprising:
   receiving data, from the at least one lane sensor, indicating an occurrence of a lane shifting event, the lane shifting event indicating the vehicle is drifting away from a vehicle lane;
   monitoring biometric data received from the gaze detection sensor;
   upon determining a gaze change event has not occurred within a threshold period of time with respect to the lane shifting event, initiating a corrective action within the vehicle;
   storing data relating to the lane shifting event and the gaze change event in a log file in a memory device of the vehicle;
   generating a report from the log file, the report directed to driving behavior of an operator of the vehicle; and
   providing access to the report to an authorized entity.

2. The system of claim 1, wherein the computer processor is communicatively coupled to the at least one lane sensor and the gaze detection sensor via a vehicle network.

3. The system of claim 1, wherein the lane shifting event is determined using a drifting metric as a function of time.

4. The system of claim 1, wherein the biometric data indicates eye positions detected for the operator of the vehicle.

5. The system of claim 1, wherein the corrective action is a notification presented to an operator of the vehicle, the notification implemented as at least one of an audio signal and a visual signal delivered through the vehicle.

6. The system of claim 5, wherein the audio signal is a voice message requesting the operator check at least one vehicle mirror before completing a lane change.

7. The system of claim 1, wherein the corrective action includes activating an anti-drift control device on the vehicle, the anti-drive control device configured to return the vehicle to the vehicle lane.

8. The system of claim 1, wherein the authorized entity comprises at least one of an owner of the vehicle, the operator of the vehicle and an insurer of the vehicle, and a government agency.

9. The system of claim 1, wherein the providing access to the report to the authorized entity comprises transmitting the report to the authorized entity over a network.

10. A method, comprising:
    receiving, from at least one lane sensor disposed in a vehicle, data indicating an occurrence of a lane shifting event, the lane shifting event indicating the vehicle is drifting away from a vehicle lane;

monitoring, by a computer processor embedded in the vehicle, biometric data received from a gaze detection sensor in the vehicle; to determine whether an operator of the vehicle has checked at least one vehicle mirror;

upon determining the operator has not checked the at least one vehicle mirror within a threshold period of time with respect to the lane shifting event, initiating a corrective action within the vehicle;

storing data relating to the lane shifting event and the determination of whether the operator checked the vehicle mirror in a log file in a memory device of the vehicle;

generating a report from the log file, the report directed to an operator's driving behavior with respect to use of vehicle mirrors when performing lane changes; and providing access to the report to an authorized entity.

11. The method of claim 10, wherein the computer processor is communicatively coupled to the at least one lane sensor and the gaze detection sensor via a vehicle network.

12. The method of claim 10, wherein the lane shifting event is determined using a drifting metric as a function of time.

13. The method of claim 10, wherein the biometric data indicates eye positions detected for the operator of the vehicle.

14. The method of claim 10, wherein the authorized entity comprises at least one of an owner of the vehicle, the operator of the vehicle and an insurer of the vehicle, and a government agency.

15. The method of claim 10, wherein the providing access to the report to the authorized entity comprises transmitting the report to the authorized entity over a network.

16. A computer program product, the computer program product comprising a storage medium having computer program instructions embodied thereon, which when executed by a computer processor, cause the computer processor to implement a method, the method comprising:

receiving, from at least one lane sensor disposed in a vehicle, data indicating an occurrence of a lane shifting event, the lane shifting event indicating the vehicle is drifting away from a vehicle lane;

monitoring biometric data received from a gaze detection sensor;

upon determining a gaze change event has not occurred within a threshold period of time with respect to the lane shifting event, initiating a corrective action within the vehicle;

storing data relating to the lane shifting event and the gaze change event in a log file in a memory device of the vehicle;

generating a report from the log file, the report directed to patterns of behavior of an operator of the vehicle during driving the vehicle; and providing access to the report to an authorized entity.

17. The computer program product of claim 16, wherein the biometric data indicates eye positions detected for the operator of the vehicle.

18. The computer program product of claim 16, wherein the authorized entity comprises at least one of an owner of the vehicle, the operator of the vehicle and an insurer of the vehicle, and a government agency.

19. The computer program product of claim 16, wherein the providing access to the report to the authorized entity comprises transmitting the report to the authorized entity over a network.

* * * * *